(12) United States Patent
Kui et al.

(10) Patent No.: US 12,016,362 B2
(45) Date of Patent: Jun. 25, 2024

(54) METHOD AND DEVICE FOR PROCESSING FLOUR

(71) Applicant: KONINKLIJKE PHILIPS N.V., Eindhoven (NL)

(72) Inventors: Xiaoyun Kui, Shanghai (CN); Ming Li, Shanghai (CN); Guangming Su, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 102 days.

(21) Appl. No.: 17/286,832

(22) PCT Filed: Dec. 19, 2019

(86) PCT No.: PCT/EP2019/086138
§ 371 (c)(1),
(2) Date: Apr. 20, 2021

(87) PCT Pub. No.: WO2020/136065
PCT Pub. Date: Jul. 2, 2020

(65) Prior Publication Data
US 2021/0329950 A1    Oct. 28, 2021

(30) Foreign Application Priority Data

Dec. 28, 2018    (WO) .............. PCT/CN2018/124804

(51) Int. Cl.
*A23L 5/10*    (2016.01)
*A21D 8/02*    (2006.01)
(Continued)

(52) U.S. Cl.
CPC .............. *A23L 5/13* (2016.08); *A21D 8/025* (2013.01); *A23L 7/109* (2016.08); *A47J 27/04* (2013.01); *A47J 2027/043* (2013.01)

(58) Field of Classification Search
None
See application file for complete search history.

(56) References Cited

U.S. PATENT DOCUMENTS 2,384,998 A * 9/1945 Haugh .................... B01D 1/18
159/48.1
4,423,082 A * 12/1983 Bauernfeind et al. .... A23L 1/16
426/557

FOREIGN PATENT DOCUMENTS

| CN | 1482867 A | 3/2004 |
| CN | 101791000 | 8/2012 |

(Continued)

OTHER PUBLICATIONS

Machine translation of KR 101307930 B1 performed on Apr. 4, 2023, Seo (Year: 2013).*

(Continued)

*Primary Examiner* — Dana Ross
*Assistant Examiner* — Kevin Guanhua Wen
(74) *Attorney, Agent, or Firm* — Maschoff Brennan

(57) ABSTRACT

Embodiments of the present disclosure relate to a method and a device for processing flour. The method comprises: adding water to the flour to increase the moisture rate of the flour; generating superheated steam; and subjecting the moistened flour to the superheated steam for a predetermined period of time. With the inventive method, superheated steam is used for processing the flour, and the flour can be treated in an easy way and in much less time.

9 Claims, 2 Drawing Sheets

(51) Int. Cl.
*A23L 7/109* (2016.01)
*A47J 27/04* (2006.01)

(56) References Cited

FOREIGN PATENT DOCUMENTS

| | | | | |
|---|---|---|---|---|
| CN | 102987515 A | | 3/2013 | |
| CN | 104872278 A | | 9/2015 | |
| CN | 107080156 | | 8/2017 | |
| JP | 2004329528 A | | 11/2004 | |
| JP | 3757953 | | 3/2006 | |
| KR | 20070027674 A | * | 3/2007 | ............... A23L 7/10 |
| KR | 101307930 B1 | * | 9/2013 | ............... A23L 5/13 |
| KR | 101886461 B1 | * | 8/2018 | ............... A47J 27/62 |
| RU | 2675988 C1 | * | 12/2018 | ............. B02C 11/08 |
| WO | WO 2014007372 A1 | * | 1/2014 | ............... A47J 27/04 |
| WO | 2016121570 | | 8/2016 | |

OTHER PUBLICATIONS

Machine translation of KR 20070027674 A performed on Apr. 4, 2023, Woo (Year: 2007).*
Machine translation of WO 2014007372 A1 performed on Apr. 4, 2023, Ohhori et al. (Year: 2014).*
Machine translation of KR 101886461 B1 performed on Apr. 4, 2023, Sobor (Year: 2018).*
Machine translation of KR 101307930 B1 performed on Oct. 19, 2023, Seo (Year: 2013).*
Machine translation of RU 2675988 C1 performed on Oct. 19, 2023, Rubio et al. (Year: 2018).*
International Search Report and Written Opinion dated Apr. 7, 2020 for International Application No. PCT/EP2019/086138 filed Dec. 19, 2019.
Hu, et al: "Modification of physicochemical properties and in vitro digestibility of wheat flour through superheated stream processing", Mar. 31, 2017.

* cited by examiner

METHOD AND DEVICE FOR PROCESSING FLOUR

CROSS REFERENCE TO RELATED APPLICATIONS

This application is the U.S. National Phase application under 35 U.S.C. § 371 of International Application No. PCT/EP2019/086138 filed Dec. 19, 2019, which claims the benefit of Patent Application Number PCT/CN2018/124804 filed Dec. 28, 2018. These applications are hereby incorporated by reference herein.

FIELD

Example embodiments of the present disclosure generally relate to food health, and more particularly, to a method and device for processing flour.

BACKGROUND

Flour such as wheat flour is commonly used as a main ingredient in many foods. Flour can be used to make various flour-based foods, such as dumplings, steamed buns, bread, noodles, cookies and the like. However, flour, especially refined wheat flour, contains much rapidly digestible starch (RDS), and this may lead to a high glycemic index (GI) value. Continuous consumption of high glycemic index food leads to a high risk of metabolic syndromes, such as obesity, cardiovascular disease and type II diabetes.

It is known that starch can be physically modified in a humid and high temperature environment (i.e., heat moisture treatment). However, such a method is often carried out in a laboratory and is not suitable for industrial, particularly home applications. Accordingly, there is a need for a device for processing flour in a fast and convenient way.

SUMMARY

In a first aspect, example embodiments of the present disclosure provide a method for processing flour. The method comprises: adding water to the flour to increase the moisture rate of the flour; generating superheated steam; and exposing the moistened flour to the superheated steam for a predetermined period of time.

According to embodiments of the present disclosure, since superheated steam is used for processing flour, the flour can be treated in an easy way and for much less time. Also, the method described above can be used in industrial and commercial applications.

In some embodiments, the added water is in gaseous form. In this way, the flour can absorb water evenly while the flour is prevented from forming dough.

In some embodiments, the temperature of the added water may be lower than the gelatinization temperature of the flour, and a difference between the temperature of the added water and the gelatinization temperature of the flour is below a threshold value. In this way, the water absorption rate of the flour is further increased.

In some embodiments, the moisture rate of the flour after adding water may be in the range of 15~35%, such as in the range of 25~30%. The moisture rate of the flour in the above range proved to be highly efficient in reducing the RDS in the flour.

In some embodiments, the temperature of the superheated steam may be within a range of 120° C.~170° C., such as in the range of 130° C.~160° C., and more particularly about 140° C. Experiments have shown that the temperature of the superheated steam in the above range is efficient in reducing the RDS in flour. In some embodiments, the length of the period of time may be within a range of 5~20 minutes.

In a second aspect, example embodiments of the present disclosure provide a device for processing flour. The device comprises a container for holding the flour, a cover for the container, and a superheated steam generator coupled with the container for generating superheated steam, wherein the superheated steam generator is configured to provide the container with the superheated steam for a predetermined period of time during operation of the device.

In some embodiments, the device may further comprise a water-adding device coupled with the container to provide water to the container to moisten the flour.

In some embodiments, the water-adding device may comprise a water nozzle, which is configured to spray water toward the flour, or an evaporator which is configured to provide water in gaseous form to the container.

In some embodiments, the device may further comprise a temperature-control device configured to control the temperature of the water added to the container to be below the gelatinization temperature of the flour.

In some embodiments, the device may further comprise a weighing meter configured to control the water amount provided to the container and/or a timer to control the time during which water is added.

In some embodiments, the container may comprise a stirrer configured to stir the flour.

In some embodiments, the superheated steam generator may comprise a heater attached to or near the container and configured to heat water to the gaseous phase.

In some embodiments, the device further comprises a temperature sensor to sense the temperature of the superheated steam and a controller to keep the temperature of the superheated steam within a range of 120° C.~170° C., such as in the range of 130° C.~160° C., and more particularly, about 140° C., based on a signal from the temperature sensor.

In a third aspect, example embodiments of the present disclosure provide a flour processing apparatus. The apparatus comprises a device for processing flour according to the first aspect of the present disclosure, and at least one processor configured to perform the method according to the second aspect of the present disclosure.

In some embodiments, the flour processing apparatus may be embodied by an air-fryer, a pasta maker, or a bread maker.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

DETAILED DESCRIPTION

Figure 1:
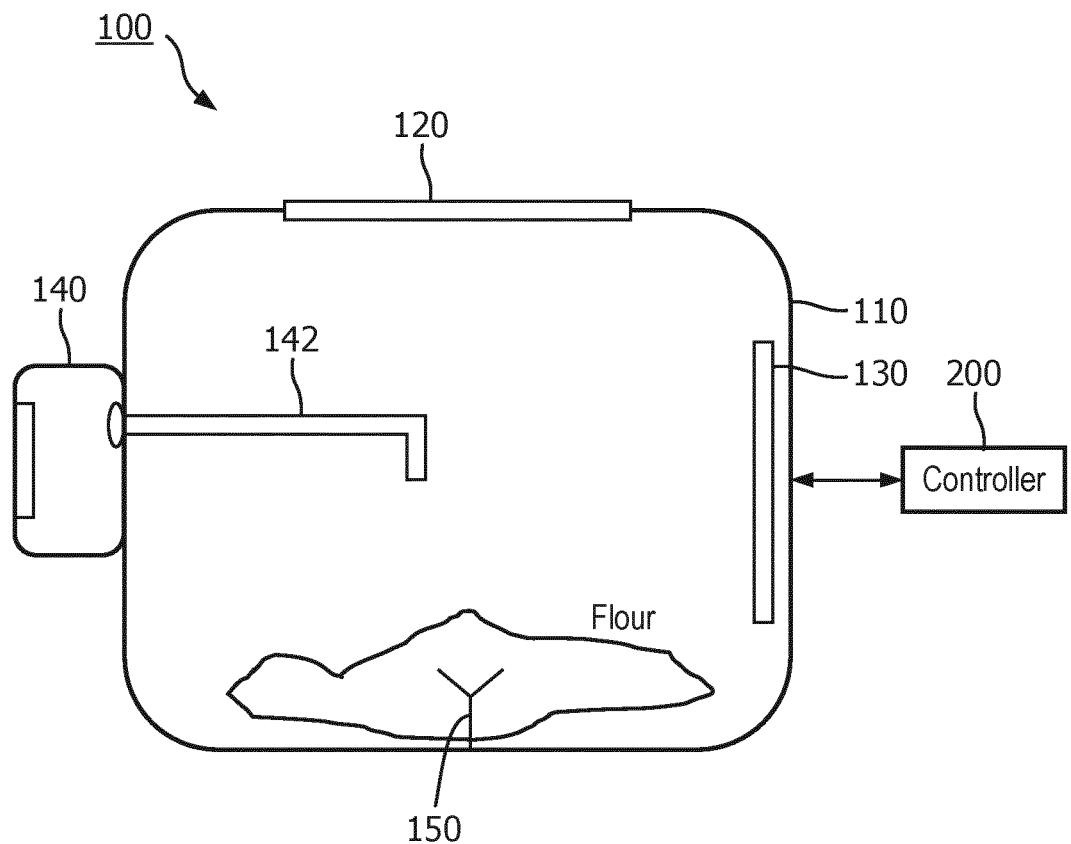
FIG. 1 illustrate a schematic view of a device for processing flour in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations to the scope of the subject matter.

It is to be understood that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

It is to be understood that in the description of exemplary embodiments of the present disclosure, various features of the present disclosure are sometimes grouped together in a single embodiment, or description thereof, for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

As mentioned above, wheat flour typically contains a high proportion of RDS with a high GI value over 80. Continuous consumption of high GI wheat flour leads to a high risk of metabolic syndromes, such as obesity, cardiovascular disease, type II diabetes and the like. In the present disclosure, a device and a method for processing flour is provided to reduce the RDS in an easy and efficient way. Before the method for processing flour is described, a description is given of the device for processing flour.

FIG. 1 illustrates a schematic view of a device 100 for processing flour in accordance with some example embodiments of the present disclosure. As shown, the device for processing flour comprises a container 110 for holding the flour, a cover 120 for the container, and a superheated steam generator 130.

The container 110 defines a chamber for housing the flour. The container 110 is provided with one or more openings for receiving flour. The flour is manually or automatically charged into the container via the opening. In some embodiments, the container may comprise heat insulation material. In this case, a high temperature within the chamber can be well maintained. In some embodiments, one or more heat insulation layers may be arranged in walls of the container. It is to be understood that the shape of the container is not subject to limitations, i.e., it may be of any shape. The size of the container can be designed to meet actual needs. In some embodiments, various existing food processing or cooking apparatus, such as an air-based fryer, a bread maker, a pasta maker, and the like, may be modified for use as the device 100 for processing flour. In this case, the cooking or food processing chamber may serve as a container.

The container 110 can receive water to moisten the flour. In some embodiments, water can be manually provided to the flour within the container. For example, a water tap or a sprayer can be used to supply the flour with water. In some embodiments, the device may comprise a water-adding device 140. For example, the water-adding device 140 comprises a water nozzle which is configured to spray water toward the flour. The water amount may by controlled in various ways, such as through the water spraying speed, the degree of opening of the nozzles, and the like. In another embodiment, the water-adding device 140 comprises an evaporator which is configured to generate water in gaseous form. The water in gaseous form can be supplied to the container via a pipe 142. If the water is in gaseous form, the flour can be evenly and quickly moistened.

In some embodiments, the device 100 may comprise a temperature-control device to control the temperature of the water added to the container, particularly in gaseous form. The ability of air to absorb water depends strongly on the temperature of the air, i.e., the higher the temperature of the air, the more water it can contain. Accordingly, when the temperature of the water in gaseous form is high, a desired moisture rate of the flour can be achieved in less time. However, the temperature of the water in gaseous form should not exceed the gelatinization temperature of the flour. When the temperature of the water is above the gelatinization temperature of the flour, the flour will gelatinize, which should be prevented.

In some embodiments, the device 100 may comprise a weighing meter configured to detect the amount of water provided to the container. In some embodiments, a timer may be provided, so that the water amount can be controlled by controlling the time during which water is added. When the water amount in the flour reaches a certain value, an alert is sent to a user. In some embodiments, a signal may be triggered to control the water-adding device 140 to stop adding water.

In some embodiments, the container may comprise a stirrer 150 configured to stir the flour. When the flour is to be moistened, the stirrer 150 may stir the flour to accelerate water absorption. It is to be understood that the stirrer 150 may be of any shape.

The cover 120 is provided for the container 110 to close the opening in the container. The cover may be opened to enable introducing the flour into the container, and during operation of the device, the cover 120 is closed to form a sealed environment. In some embodiments, the cover is hinged to the container. In other embodiments, the cover is removably attached to the container. The cover may be of any shape and/or size. It is to be understood that the cover should not be interpreted as a physical cover but as a functional cover. For example, in the case that various existing food processing or cooking apparatus are modified to be used as the device 100 for processing flour, there may be no specific cover arranged for covering the cooking chamber. Rather, for example, a part of a housing of the cooking apparatus may function as a cover during operation of the apparatus.

The superheated steam generator 130 can generate superheated steam and can introduce the superheated steam into the container 120. In the illustrated embodiments, the superheated steam generator 130 may be provided inside the container. For example, the superheated steam generator 130 may comprise a heater attached to or near the container, for example, the side walls or bottom walls of the container. Gaseous water or steam may be provided to the container and the steam can be heated inside the container to generate the superheated steam. In this case, the ducts may be omitted. In some embodiments (not shown), the superheated steam generator 130 may comprise one or more ducts which are in communication with the chamber of the container. The superheated steam generator 130 may generate the superheated steam outside the container and then supply the container with the superheated steam via the ducts.

In some embodiments, the superheated steam generator 130 can be part of the water-adding device 140. For example, the water-adding device 140 may comprise one or more heaters. The operation of the water-adding device 140 can be controlled to generate superheated steam by control of the operation of the heaters. In this case, the water-adding device 140 is operable to supply the container with water or superheated steam according to different phases of flour processing.

In some embodiments, the superheated steam generator 130 may comprise a temperature sensor to sense the temperature of the superheated steam. In some embodiments, the device 100 comprises a controller 200. The controller 200 may be used to keep the temperature of the superheated steam within a range of 120° C.~170° C., based on a signal from the temperature sensor. For example, it is possible to keep the temperature in the range of 130° C.~160° C. More specifically, in some embodiments, the temperature can be kept at about 140° C. The controller 200 may be a separate component. Alternatively, the controller may be integrated with other control elements of the device.

Figure 2:
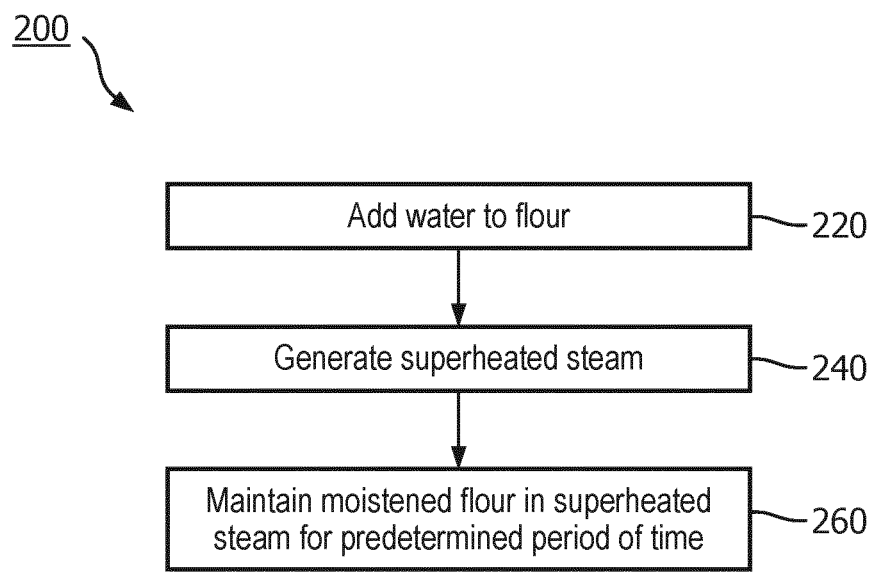
FIG. 2 illustrates a flowchart of a method for processing flour in accordance with some example embodiments of the present disclosure.

Operations of the device 100 for processing flour are described with reference to FIG. 2. FIG. 2 illustrates a flowchart of a method 200 for processing flour in accordance with some example embodiments of the present disclosure. The method 200 can be implemented by, e.g., the device 100 for processing the flour, to efficiently and easily reduce the RDS in the flour.

At block 220, water is added to the flour to increase the moisture rate of the flour. The moisture rate of the flour before processing is typically around 8-10%. In order to reduce the RDS in the flour, the moisture rate of the flour has to be increased. Through a number of experiments, the inventors have found that a moisture rate of flour in the range of 15~35%, such as in the range of 25~30%, is advantageous. In some embodiments, water may be sprayed on the flour. If water is directly poured onto the flour, the flour may form dough. This should be prevented since in this case the moisture rate of the flour is not uniform and cannot be well controlled. In some other embodiments, the water is added in a gaseous or steam state. In this case, the flour can absorb water evenly and is prevented from forming dough. As mentioned above, in some embodiments, the temperature of the steam is as high as possible but below the gelatinization temperature of the flour. This is because when the temperature of steam is high, the water content in the steam is higher. When the water content in the steam is higher, the moisture rate of the flour can be increased to the desired value in less time.

At block 240, superheated steam is produced. In some embodiments, the superheated steam is produced by heating the steam. In some embodiments, the superheated steam may be produced outside the container. Alternatively, the superheated steam may be produced inside the container. The temperature of the superheated steam should be in a proper range. Through a number of experiments, the inventors have found that a temperature of the superheated steam within a range of 120° C.~170° C., such as in the range of 130° C.~160° C., and, more particularly, about 140° C., is advantageous. If the temperature of the superheated steam is too high, the flour may gelatinize. If the temperature of the superheated steam is too low, the RDS cannot be reduced. This will be more apparent with reference to the principle of reducing the RDS described hereinafter.

At block 260, the moistened flour is maintained in the superheated steam for a predetermined period of time. In some embodiments, the produced superheated steam generated at block 240 may be injected into the moistened flour in the container. Alternatively, in the case that the produced superheated steam is produced in the container, the injection step may be omitted. During the maintaining step, the flour is maintained in the environment of high temperature and high humidity and the RDS is reduced. Reduction of the RDS is due to several reasons, including, for example, crystallites disruption, starch chain interaction within amorphous and crystalline domains, disruption of double helical structures in the amorphous region, and rearrangement of the disrupted crystals of the starch. With the superheated steam of the present disclosure, the interaction between amino acid radicals of the proteins is intensified and the denatured proteins can provide greater adhesion to starch granules. The inhibiting effect of lipids on starch digestibility arises from the formation of amylose-lipid complexes. In this way, the RDS in the flour can be reduced. The processed flour contains a reduced amount of RDS and is healthy food with a lower GI value. Through a number of experiments, the inventors have found that the period of time within a range of 5~20 minutes is sufficient to complete the flour process. It is to be understood that the above time period is merely illustrative rather than limiting; and the time period might vary from the above range according to the different kinds of flour.

Figure 3:
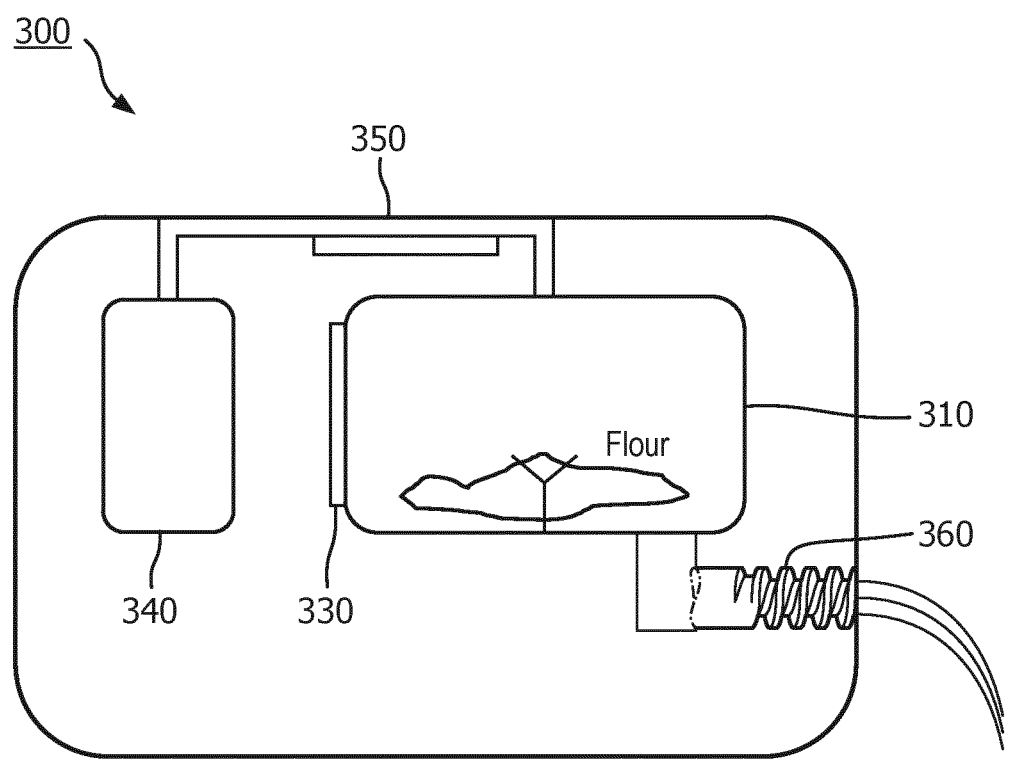
FIG. 3 illustrates a schematic view of a device for processing flour in accordance with some example embodiments of the present disclosure.

As mentioned above, various existing food processing or cooking apparatus, such as, an air-based fryer, a bread maker, a pasta maker, and the like, may be modified for use as the device for processing flour according to one example embodiment of the present disclosure. FIG. 3 illustrates a schematic view of a device 300 for processing flour in accordance with one example embodiment of the present disclosure.

As shown in FIG. 3, the device 300 is a modified pasta maker. The device 300 comprises a container 310, a water tank 340, and an extrusion screw 360. Flour can be held in the container 310. Water tank 340 containing water is connected to the container 310 to add water to the flour inside the container 310. A stirrer may stir the flour to form kneaded dough. The kneaded dough in the container can then be formed into the desired pasta noodle shape via actions of the extrusion screw 360. In addition to these components, a heater 350 and a superheated steam generator 330 are also provided. In the illustrated embodiment, the superheated steam generator 330 comprises a heater.

With the device 300, the flour can be processed in an easy way. Its operation is described below.

In one embodiment, the device at least comprises a flour processing mode. In this mode, the flour in the container 310 is moistened and the moisture rate of the flour is raised to a targeted value or range. In one embodiment, the water tank 340 may be operable to generate steam, and the temperature of the steam is controlled by ON/OFF of the heater 350. The stirrer may be operable to speed up the moistening step. In one embodiment, the amount of water may be controlled based on the weight of the flour to be processed. When the moisture rate of the flour is raised to a targeted value or range, the superheated steam generator 330 starts to operate to heat the steam such that the superheated steam is generated. The temperature of the steam is controlled to a targeted value or range by ON/OFF of the heater. The moistened flour is subjected to the superheated steam for a predetermined length of time. In this step, the stirrer may be operable to speed up the step. The processed flour can be stored for later usage or can be used to make noodles.

It is to be understood that the above pasta maker is merely an illustrative example, other cooking devices may be modified to fulfil the RDS reduction function within the spirit of the invention.

In another aspect of the present disclosure, a flour processing apparatus is provided. The apparatus comprises a device for processing flour as mentioned above and at least one processor configured to perform the method as mentioned above.

Generally, various embodiments of the present disclosure may be implemented in hardware or special purpose circuits, software, logic or any combination thereof. Some aspects may be implemented in hardware, while other aspects may be implemented in firmware or software, which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented, as non-limiting examples, in hardware, software, firmware, special purpose circuits or logic, general purpose hardware or controllers or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations to the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for processing flour, comprising:
 a container for holding the flour,
 a cover for the container,
 a superheated steam generator coupled with the container for generating superheated steam,
 a water-adding device coupled with the container to provide water in gaseous form to the container so as to moisten the flour, and
 a temperature-control device configured to control temperature of the water in gaseous form added to the container to be below gelatinization temperature of the flour such that the flour is not gelatinized,
 wherein the superheated steam generator is configured to provide the container with the superheated steam for a predetermined period of time when the device is in operation.

2. The device according to claim 1, wherein the water-adding device comprises an evaporator which is configured to provide water in gaseous form to the container.

3. The device according to claim 1, further comprising a weighing meter configured to control an amount of the water provided to the container, and/or a timer to control time duration of the water being provided to the container.

4. The device according to claim 1, wherein the container comprises a stirrer configured to stir the flour.

5. The device according to claim 1, wherein the superheated steam generator comprises a heater attached to or near the container and configured to heat water in gaseous form.

6. The device according to claim 1, further comprising a temperature sensor to sense temperature of the superheated steam and a controller to keep the temperature of the superheated steam to be within a range of 120° C.~170° C. based on a signal from the temperature sensor.

7. A flour processing apparatus, comprising the device according to claim 1, and at least one processor configured to execute a computer program, stored in a computer readable medium, to process the flour.

8. The device according to claim 6, wherein the temperature of the superheated steam is within a range of 130° C.~160° C.

9. The device according to claim 6, wherein the temperature of the superheated steam is about 140° C.

* * * * *